Sept. 24, 1957

S. STEINITZ 2,807,754

POWER TRANSMISSION

Filed Nov. 23, 1954

INVENTOR.
STEPHAN STEINITZ

BY Clement J Paznokas

ATTORNEY 2,807,754

POWER TRANSMISSION

Stephan Steinitz, St. Louis, Mo., assignor to Vickers, Incorporated, Detroit, Mich., a corporation of Michigan Application November 23, 1954, Serial No. 470,658

11 Claims. (Cl. 315—259)

This invention relates to power transmission and more particularly to magnetic amplifier circuits for controlling a load that may vary over a considerable range.

In lighting control circuits, such as dimmer circuits, it is desirable to provide, for any given setting of a control, a substantially constant output voltage to accommodate a wide range of loads, such as additions or subtractions of lamps, etc. This would permit each setting to be calibrated in load volts independent of the load size. If lamp characteristics are the same, then each setting will provide the same percentage of full brightness for any lamp size (in watts). If the load voltage can be maintained constant for any given preset, then the addition of other lamps to a base load will not affect the brilliance of the base load.

In accordance with the present invention the aforesaid desirable advantages are obtained by supplying the load through a main magnetic amplifier controlled by current derived from the output of a pilot magnetic amplifier which receives at least a portion of its supply power through a path which includes the load, by connecting the pilot, amplifier, through transformer coupling, across the main amplifier, thus supplying the pilot amplifier with power varied in response to the load voltage.

It is therefore an object of the invention to provide a novel power circuit with a pilot amplifier driven main amplifier for supplying a range of loads with substantially constant voltage for any given control setting.

It is another object of this invention to provide a new and useful magnetic amplifier controlled circuit for supplying a wide range of loads with a substantially constant voltage for any given setting.

Another object is to provide a magnetic amplifier controlled supply circuit for a range of loads, with a control that may be calibrated in different load voltage settings, each of which will maintain a substantially constant voltage in the output through a wide range of loads.

Another object of the present invention is a magnetic amplifier controlled illumination intensity control circuit.

A further object is a magnetic amplifier controlled dimmer circuit which, for any given control setting, will provide a substantially constant voltage to the lamp load regardless of the size of the load.

Still another object is to provide a magnetic amplifier controlled dimmer which, for any given control setting, will provide constant illumination intensity for a base lamp load or the remainder of a base lamp load even when lamps are added to or subtracted from the base load.

Further objects and advantages of the present invention will be apparent from the following description, reference being had to the accompanying drawings wherein a preferred form of the present invention is clearly shown.

Figures 1, 2:
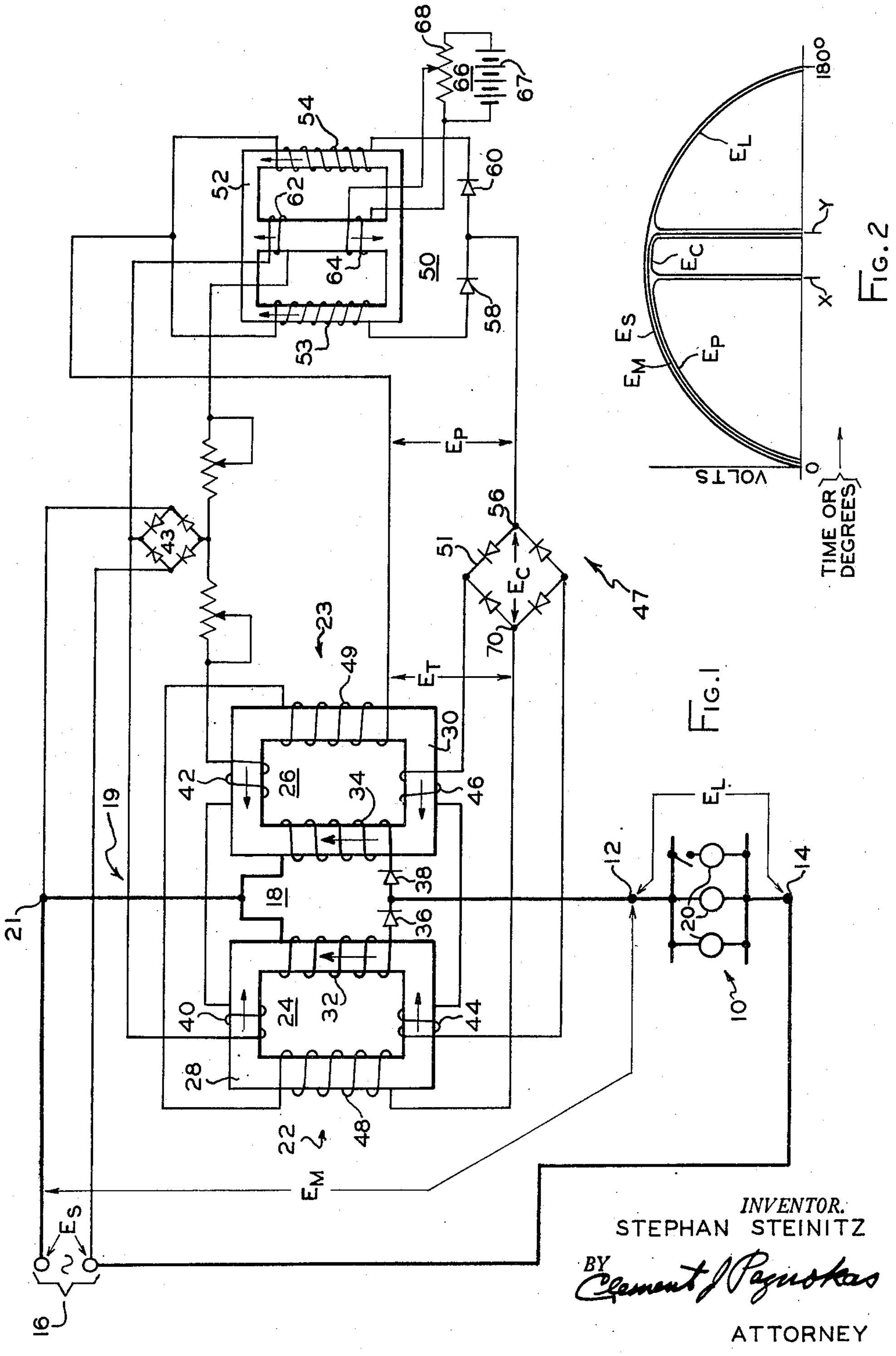
Fig. 1 is a circuit diagram illustrating a preferred embodiment of the invention.
Fig. 2 is a chart showing the voltage versus time curves of the relative voltages across various parts of the apparatus of Fig. 1.

As will be seen in Fig. 1 a load 10 connected in a load circuit between a circuit point 12 and a power input terminal 14 is supplied with power from a power supply source 16 through a magnetic amplifier 18 hereinafter referred to as the main amplifier and connected in a circuit 19 connected between circuit point 12 and a power input terminal 21. Although applicable to other types of loads, the apparatus of the present invention is especially advantageous and desirable as a control for lighting circuits. Thus the load 10, by way of example, is shown as a plurality of parallel lamp circuits 20, each of which may be cut in or out of the circuit.

The particular amplifier illustrated as an example at 18 is a self-saturating amplifier known as the "doubler" magnetic amplifier. A self-saturating magnetic amplifier is a type of regenerative feedback magnetic amplifier employing internal feedback. A characterizing feature of the "doubler" is that it furnishes alternating current to its load. Included in the amplifier 18 is a pair of self-saturating reactor branches 22 and 23 connected between the power supply terminal 21 and the output terminal 12. Thus, the branches are connected between the load and the power supply source 16. The branches are provided with saturable reactors 24 and 26 having, respectively magnetizable cores 28 and 30 carrying load windings 32 and 34 connected in parallel branches between terminals 12 and 21. The respective branches also included unidirectional valves such as half-wave rectifiers 36 and 38, each connected in series with one of the load windings thereby to subject each load winding to intermittent unidirectional current and provide self-saturation (internal regenerative feedback) to the reactors. With respect to the supply voltage from source 16 or to any common point of the two branches, the rectifiers 36 and 38 are oppositely related to each other, i. e., one conducts on one half cycle of the supply voltage, and the other conducts on the other half cycle. The particular arrangement shown results in alternating current being furnished to the load 10 through the amplifier 18.

Amplifier 18 is biased by any suitable means, for example by bias windings 40 and 42 carried by cores 28 and 30 respectively, and connected to the output of a rectifier 43 supplied from the alternating current source 16. The reactors 24 and 26 are also provided with control windings 44 and 46 which have connected thereto a control circuit 47 which supplies control current to the control windings. The control circuit 47 is supplied with voltage proportional to that across the main amplifier by being transformer-coupled across amplifier 18 through pickup windings 48 and 49 carried by the cores 28 and 30, and arranged to have induced therein fundamental frequency voltage from the load windings 32 and 34. The control circuit 47 includes a pilot amplifier 50 which supplies energy to the control windings 44 and 46 through a rectifier 51. The reactors of the main amplifier are used as transformers to couple the control circuit 47 across the main amplifier, the load windings 32 and 34 acting as primaries and the pickup windings 48 and 49 as secondaries in series aiding relation, load winding 32 and pickup winding 48 operating on one half cycle, while load winding 34 and pickup winding 49 operate on the other half cycle. Thus, although load windings 32 and 34 individually have only unidirectional current flowing therein, the pickup coils 48 and 49 have across both in series an alternating voltage, Like amplifier 18, amplifier 50, in the particular example shown, is also a "doubler" self-saturating magnetic amplifier furnishing alternating current to its load, the rectifier 51. However, to illustrate an alternative core arrangement for "doubler" amplifiers, amplifier 50 is shown as provided with a single core 52, which is substantially equivalent to the two-core arrangement in amplifier 18. The core 52 carries a pair of load windings 53 and 54 connected in two parallel branches between the pickup winding 49 and an input terminal 56 of the rectifier 51. As in the other amplifier, oppositely related rectifiers 58 and 60 are connected in series with the respective load windings. One rectifier conducts on one half of the supply voltage cycle, while the other rectifier conducts on the opposite half cycle. Core 52 is also provided with a bias winding 62 and a control winding 64, the bias winding being connected to the rectifier 43, and the control winding being connected to a dimming control circuit 66 including a source of control current, for example a battery 67, and an adjustable impedance 68. The load voltage or illumination intensity of the lamps 20 may be set as desired by adjusting the impedance 68 and thereby the control current supplied to the control winding 64. One of the advantages of the present invention is that for any given setting of a control such as impedance 68, the voltage across the load 10 will be maintained substantially constant. The other input terminal 70 of the rectifier 51 is connected to the other pickup coil 48.

In the main amplifier the control windings 44 and 46 are in series opposition as also are the bias windings 40 and 42 to cancel out induced fundamental frequency voltage, while in the pilot amplifier there is no fundamental frequency voltage induced in the control and bias windings because the fundamental fluxes cancel in the middle leg of the reactor core 52. In contrast pickup coils 48 and 49 are in series aiding relation with respect to the fundamental frequency voltages induced therein.

Although amplifier 50 and its load circuit (rectifier 51 and control windings 44 and 46) are connected across terminals 21 and 12 by transformer coupling, while amplifier 18 and its load circuit 10 are connected across terminals 21 and 14, both amplifiers draw their power from the supply source 16. In order to make the power supplied to the pilot amplifier 50 respond to the voltage of load 10, at least a part of the energy supplied to the pilot amplifier must pass through the load 10. Thus, the load should be interposed in at least one current path between the power supply 16 and the pilot amplifier 50. In the particular embodiment shown only one current path is shown between the power supply 16 and the pilot amplifier 50, and the load 10 being in this path all of the power supplied to the pilot amplifier passes through the load 10. Thus, the power supplied to the load windings of amplifier 50 will vary in response to changes in the voltage of load 10 because the load 10 is interposed between the power supply 16 and the amplifier 50 with its immediate load (rectifier 51 and control windings 44 and 46). It will be noted that this arrangement results broadly in the control circuit 47 with the pilot amplifier 50 being supplied with voltage which is a function of the voltage drop across the amplifier 18. In order to apply to the control circuit 47 a voltage which is a function of the voltage across amplifier 18, the control circuit 47 should be coupled across at least a portion of the main amplifier circuit 19. Although this is accomplished by transformer-coupling through the pickup coils 48 and 49 in the embodiment shown, the control circuit 47 may be transformer-coupled across the main amplifier in an alternative manner by eliminating the pickup windings 48 and 49, and substituting therefor the secondary winding of a transformer, and connecting the primary of this transformer to the terminals 21 and 12, the secondary of course being connected to the control circuit 47 in lieu of the pickup windings. In the specific embodiment shown, assuming negligible drop in the rectifiers 36 and 38, the voltage available to the amplifier 50 and its immediate load is the source voltage at 16 minus the voltage across the load 10, as modified by the transformation ratio between the load windings and pickup coils of the main amplifier 18. This happens to be the voltage across the reactors of amplifier 18, as modified by the transformation ratio.

The polarities and relationship of the windings of both amplifiers should be such that, over the operating range, a decrease in the voltage across load 10, for example by a reduction in load resistance, will at least tend to increase the output of the pilot amplifier 50, and an increase in the output of amplifier 50 will at least tend to increase the output of the main amplifier 18. In the embodiment shown this is effected by polarizing each winding with respect to its associated core and the rest of the circuit to provide mmfs. in the direction of the arrow placed under the respective winding. The arrows under the load windings 32, 34, 53 and 54 indicate the direction of the load winding mmfs. which provide the self-saturation. Thus, any mmfs. in a direction additive to or aiding the load winding mmfs. tend to increase the output of a reactor, while mmfs. opposed to the load winding mmfs. tend to decrease the output of a reactor.

For the system to compensate for load changes and tend to maintain the voltage constant independent of load, the pilot amplifier must fire earlier in the supply voltage cycle than the main amplifier, i. e., the firing angle of the pilot amplifier must be smaller than that of the main amplifier. As is well known in the magnetic amplifier art, the firing angle is the "point" during the supply voltage cycle when the reactor saturates. This is when the major portion of the supply voltage first appears across the load. Where the voltage change is not abrupt and the firing angle is not well defined, the relationship between the amplifiers may be determined on the basis of voltage-time integrals. The ratio of the voltage-time integral across a reactor to that across its total load should be greater for the reactor in the main amplifier than for the reactor in the pilot amplifier. This relationship means that the pilot amplifier fires before the main amplifier can fire. An example illustrating this relationship for a particular signal current flowing in winding 64 is shown in the chart of Fig. 2. In this figure voltage-time curves show the intervals (time or degrees of a half cycle) during which all or part of the supply voltage $E_S$ appears across various portions of the circuit, corresponding labels appearing on the curves and across the related circuit portions in Fig. 1. $E_S$ is the supply voltage, $E_C$ is the voltage across rectifier 51 (effectively across control windings 44 and 46), $E_L$ is the voltage across the load 10, $E_M$ is the voltage across the main amplifier (across terminals 12 and 21), and $E_P$ is the voltage across the pilot amplifier. $E_T$ is the transformed voltage across the pickup coils 48 and 49, and assuming as an example approximately a 1:1 transformation ratio, the voltage $E_T$ will be approximately equal to the voltage $E_M$ across the main amplifier, and both voltages can be represented by $E_M$ in Fig. 2. The area under each curve represents the voltage-time integral absorbed by the related component or circuit portion. In the reactors the voltage-time integral (flux change) is limited by the magnetic condition of the core. Fig. 2 shows the pilot amplifier firing at the time or angle X, and the main amplifier firing at the later time Y (greater angle). In this consideration the load on the pilot amplifier also includes the main load 10.

One way of adjusting the system to effect such firing or voltage-time integral relations through the full range of the main amplifier 18 is to bias the main amplifier to cutoff when the pilot amplifier 50 is quiescent or with no control signal in winding 64. Preferably the pilot amplifier is also biased to cutoff when there is no control signal current supplied to control winding 64, thus more efficiently utilizing the full range of the pilot amplifier. As long as the main amplifier 18 is biased to cutoff when no control current flows in control winding 64, the main amplifier can fire only after the pilot amplifier 50 fires, thus permitting the pilot amplifier to supervise or regulate the output of the main amplifier.

The firing angle of any particular amplifier depends on many factors collectively, each of which affects the firing angle. These factors and their effects are well known, and include for example the particular core materials, flux density, winding factors such as number of turns, coil diameter, wire size, degree of coupling, supply voltage, bias, and many others. The design considerations for determining firing angles of magnetic amplifiers are well known in the art and require no further explanation here.

In operation suppose that the load 10 first consists of a 100 watt lamp and the control 68 is adjusted to provide 100 volts across the lamp load. Further, suppose that the load is increased by switching a second 100 watt lamp in parallel with the first lamp. This decreases the total load resistance and tends to decrease the load voltage $E_L$, which in turn tends to increase $E_P$, the proportion of the supply voltage available to the pilot amplifier. This tends to increase the output of the pilot amplifier and thereby drive upward the main amplifier, thus tending to reduce $E_M$ the voltage across the main amplifier and raising $E_L$ the voltage across the load, back toward its original 100 volts. The reverse happens when the load is reduced by cutting out lamps and increasing the load resistance with a consequent tendency to increase $E_L$, which increase is subtracted from $E_P$ the voltage available to the pilot amplifier. This in turn decreases the output of the pilot amplifier and thereby the output of the main amplifier which increases $E_M$ the voltage across the main amplifier, thus reducing the load voltage $E_L$ to its original value.

$E_C$ being the difference between $E_T$ and $E_P$, the control of the main amplifier is responsive to the difference between $E_T$ (a voltage proportional to the voltage across the main amplifier as modified by transformation ratio, if any) and $E_P$ the voltage across the pilot amplifier.

Actually the apparatus regulates the firing angle of the main amplifier thereby tending to hold constant the R. M. S. voltage across the load despite variations in the load.

While the form of embodiment of the invention as herein disclosed constitutes a preferred form, it is to be understood that other forms might be adopted, all coming within the scope of the claims which follow.

What is claimed is as follows:

1. A control system comprising a power supply source, a load, a main amplifier interposed between the load and supply source for controlling the power supplied to the load, the main amplifier having a control element, means connected to the control element and including a pilot amplifier for supplying current to said control element, and means for supplying power from said power source to the load side of the pilot amplifier through the load whereby the power supplied to the pilot amplifier is responsive to the voltage across the load, the latter means comprising a circuit transformer-coupled across said main amplifier and including the pilot amplifier, the pilot amplifier having a smaller firing angle than the main amplifier.

2. A control system comprising a power supply source, a load, a main amplifier interposed between the load and supply source for controlling the power supplied to the load, the main amplifier having a control winding, means connected to the control winding and including a pilot amplifier for supplying current to said control winding, and means for supplying power from said power source to the load side of the pilot amplifier through the load whereby the power supplied to the pilot amplifier is responsive to the voltage across the load, the latter means comprising a circuit transformer-coupled across the main amplifier and including the pilot amplifier, said amplifiers being self-saturating magnetic amplifiers and the pilot amplifier having a smaller firing angle than the main amplifier.

3. A control system comprising a power supply source, a load, a magnetic main amplifier interposed between the load and supply source for controlling the power supplied to the load, the main amplifier having magnetizable core means carrying load winding means, control winding means, and pickup winding means, said load winding means and pickup winding means being inductively coupled, means connected to the control winding means including a pilot amplifier for supplying current to said control winding means, and means for supplying power from said power source to the load side of the pilot amplifier through the load whereby the power supplied to the pilot amplifier is responsive to the voltage across the load, the latter means comprising a circuit connected to the pickup winding means and including the pilot amplifier, the pilot amplifier having a smaller firing angle than the main amplifier.

4. A control system comprising a power supply source, a load, a magnetic main amplifier interposed between the load and supply source for controlling the power supplied to the load, the main amplifier having magnetizable core means carrying load winding means, control winding means, and pickup winding means, said load winding means and pickup winding means being inductively coupled, means connected to the control winding means including a pilot amplifier for supplying current to said control winding means, and means for supplying power from said power source to the load side of the pilot amplifier through the load whereby the power supplied to the pilot amplifier is responsive to the voltage across the load, the latter means comprising a circuit connected to the pickup winding means and including the pilot amplifier, said amplifiers being self-saturating magnetic amplifiers and the pilot amplifier having a smaller firing angle than the main amplifier.

5. A control system comprising first and second power input terminals for connection to a power supply source, a circuit point, a first circuit including a main magnetic amplifier connected between the first input terminal and the circuit point, a load connected between the circuit point and the second input terminal, said magnetic amplifier having a control winding, means connected to the control winding and including a pilot magnetic amplifier for supplying current to said control winding, said pilot amplifier having a saturable reactor with a load winding to the impedance of which said current is responsive, and means for supplying power to the pilot amplifier through said load whereby the power supplied to the pilot amplifier is subject to the voltage across said load, the latter means comprising a second circuit transformer-coupled across at least a portion of said first circuit, and second circuit including said load winding, said pilot amplifier having a smaller firing angle than the main amplifier.

6. A control system comprising first and second power input terminals for connection to a power supply source, a circuit point, a first circuit including a main magnetic amplifier connected between the first input terminal and the circuit point, a load connected between the circuit point and the second input terminal, said magnetic amplifier having a control winding, means connected to the control winding and including a pilot magnetic amplifier for supplying current to said control winding, said pilot amplifier having a saturable reactor with a load winding to the impedance of which said current is responsive, and means for supplying power to the pilot amplifier through said load whereby the power supplied to the pilot amplifier is subject to the voltage across said load, the latter means comprising a second circuit transformer-coupled across at least a portion of said first circuit, said second circuit including said load winding, said amplifiers being self-saturating magnetic amplifiers and the pilot amplifier having a smaller firing angle than the main amplifier.

7. A control system comprising first and second power input terminals for connection to a power supply source, a circuit point, a first circuit including a main magnetic amplifier connected between the first input terminal and the circuit point, a load connected between the circuit point and the second input terminal, said magnetic amplifier having a control winding, means connected to the control winding and including a pilot magnetic amplifier for supplying current to said control winding, said pilot amplifier having a saturable reactor with a load winding to the impedance of which said current is responsive, and means for supplying power to the pilot amplifier through said load whereby the power supplied to the pilot amplifier is subject to the voltage across said load, the latter means comprising a second circuit transformer-coupled across at least a portion of said first circuit, said second circuit including said load winding and said control winding, said pilot amplifier having a smaller firing angle than the main amplifier.

8. A control system comprising first and second power input terminals for connection to a power supply source, a circuit point, a first circuit including a main magnetic amplifier connected between the first input terminal and the circuit point, a load connected between the circuit point and the second input terminal, said magnetic amplifier having a control winding, means connected to the control winding and including a pilot magnetic amplifier for supplying current to said control winding, said pilot amplifier having a saturable reactor with a load winding to the impedance of which said current is responsive, and means for supplying power to the pilot amplifier through said load whereby the power supplied to the pilot amplifier is subject to the voltage across said load, the latter means comprising a second circuit transformer-coupled across at least a portion of said first circuit, said second circuit including said load winding and said control winding, said amplifiers being self-saturating magnetic amplifiers and the pilot amplifier having a smaller firing angle than the main amplifier.

9. A control system comprising first and second power input terminals for connection to a power supply source, a circuit point, a first circuit including a main magnetic amplifier connected between the first input terminal and the circuit point, a load connected between the circuit point and the second input terminal, said magnetic amplifier having a control winding, means connected to the control winding and including a pilot magnetic amplifier for supplying current to said control winding, said pilot amplifier having a saturable reactor with a load winding to the impedance of which said current is responsive, and means for supplying power to the pilot amplifier through said load whereby the power supplied to the pilot amplifier is subject to the voltage across said load, the latter means comprising a second circuit transformer-coupled across at least a portion of said first circuit, said second circuit including said load winding, said pilot amplifier having a smaller firing angle than the main amplifier.

10. A control system comprising first and second power input terminals for connection to a power supply source, a circuit point, a first circuit including a main magnetic amplifier connected between the first input terminal and the circuit point, a load connected between the circuit point and the second input terminal, said magnetic amplifier having a control winding, means connected to the control winding and including a pilot magnetic amplifier for supplying unidirectional current to said control winding, said pilot amplifier having a saturable reactor with a load winding to the impedance of which said current is responsive, and means for supplying power to the pilot amplifier through said load whereby the power supplied to the pilot amplifier is subject to the voltage across said load, the latter means comprising a second circuit transformer-coupled across at least a portion of said first circuit, said second circuit including said load winding, said amplifiers being self-saturating magnetic amplifiers and the pilot amplifier having a smaller firing angle than the main amplifier.

11. A lighting control system comprising first and second power input terminals for connection to a power supply source, a circuit point, a first circuit including a main magnetic amplifier connected between the first input terminal and the circuit point, a lamp load connected between the circuit point and the second input terminal, said magnetic amplifier having a control winding, means connected to the control winding and including a pilot magnetic amplifier for supplying current to said control winding, said pilot amplifier having a saturable reactor with a load winding to the impedance of which said current is responsive, means for supplying power to the pilot amplifier through said load whereby the power supplied to the pilot amplifier is subject to the voltage across said load, the latter means comprising a second circuit transformer-coupled across at least a portion of said first circuit, said second circuit including said load winding, said pilot amplifier having a control winding and a smaller firing angle than the main amplifier, and a dimming circuit connected to the control winding of the pilot amplifier.

References Cited in the file of this patent

UNITED STATES PATENTS

| | | |
|---|---|---|
| 2,085,060 | Young | June 29, 1937 |
| 2,220,415 | La Roque | Nov. 5, 1937 |
| 2,629,853 | Harder et al. | Feb. 24, 1953 |
| 2,688,723 | Kadushin et al. | Sept. 7, 1954 |
| 2,709,774 | Wells | May 31, 1955 |
| 2,712,105 | Mathias et al. | June 28, 1955 |